(12) United States Patent  
Becker

(10) Patent No.: US 11,565,737 B1  
(45) Date of Patent: Jan. 31, 2023

(54) VEHICLE STEERING ATTACHMENT

(71) Applicant: Velossa Tech Engineering, Inc., Davie, FL (US)

(72) Inventor: Dan Joseph Becker, Davie, FL (US)

(73) Assignee: Velossa Tech Engineering, Inc., Davie, FL (US)

( * ) Notice: Subject to any disclaimer, the term of this patent is extended or adjusted under 35 U.S.C. 154(b) by 0 days.

(21) Appl. No.: 17/673,153

(22) Filed: Feb. 16, 2022

(51) Int. Cl.  
    *B62D 1/06*     (2006.01)

(52) U.S. Cl.  
    CPC ........................... *B62D 1/06* (2013.01)

(58) Field of Classification Search  
    CPC . B62D 1/06; B62D 1/065; B62D 1/10; B62D 1/08; B64C 13/0423; B62K 21/125  
    See application file for complete search history.

(56) References Cited

U.S. PATENT DOCUMENTS

| | | | | |
|---|---|---|---|---|
| 1,002,663 A * | 9/1911 | Fest | ........................... | B62D 1/10 74/555 |
| 1,446,304 A * | 2/1923 | Holtz | ........................ | B62D 1/04 74/557 |
| 1,448,921 A * | 3/1923 | Ershkowitz | ........... | B62K 21/125 74/551.8 |
| 1,531,638 A * | 3/1925 | Zamberletti | ............. | B62D 1/10 74/494 |
| 2,425,240 A * | 8/1947 | George | .................... | B62D 1/06 74/552 |
| 2,968,969 A * | 1/1961 | Henning | ................... | B62D 1/04 74/552 |
| 3,289,493 A * | 12/1966 | Church | ................ | B62K 21/125 280/270 |
| 5,193,777 A * | 3/1993 | Faulstich | ............... | B60N 3/005 224/276 |
| 5,195,394 A * | 3/1993 | Latta | ..................... | B62K 21/125 74/551.8 |
| 5,219,415 A * | 6/1993 | Weinstein | ............ | B60Q 1/0082 200/61.54 |
| 5,315,895 A * | 5/1994 | Kattus | .................. | B62K 21/125 74/551.8 |
| 11,312,294 B1 * | 4/2022 | Matsu | ..................... | B60K 37/06 |
| 11,318,979 B2 * | 5/2022 | Kerschbaum | ............ | B62D 1/06 |

(Continued)

FOREIGN PATENT DOCUMENTS

| | | | | |
|---|---|---|---|---|
| DE | 10227196 A1 * | 1/2004 | ............... | B62D 1/06 |
| DE | 102005044289 A1 * | 3/2007 | ......... | B60R 25/0224 |

(Continued)

OTHER PUBLICATIONS

Machine Translation of DE 10 2018 216 137.*

(Continued)

*Primary Examiner* — Brian J McGovern  
(74) *Attorney, Agent, or Firm* — Bekiares Eliezer LLP

(57) ABSTRACT

The present disclosure provides a vehicle steering attachment configured to augment a vehicle steering device, the vehicle steering attachment comprising: a first end configured to secure to a left handle of the vehicle steering device; a second end configured to secure to a right handle of the vehicle steering device; and a middle portion disposed between the first end and the second end, wherein the left handle and the right handle connect to a center section.

12 Claims, 17 Drawing Sheets

(56) References Cited

U.S. PATENT DOCUMENTS

| | | | |
|---|---|---|---|
| 2002/0067030 A1* | 6/2002 | Burgess | B60R 21/26 280/728.2 |
| 2002/0194946 A1* | 12/2002 | Jackson | B62D 1/06 74/558 |
| 2003/0066379 A1* | 4/2003 | Kobayashi | B62D 1/166 74/552 |
| 2004/0099468 A1* | 5/2004 | Chernoff | B62D 1/06 180/409 |
| 2005/0257641 A1* | 11/2005 | Hobson | B62K 11/14 74/551.8 |
| 2009/0314126 A1* | 12/2009 | Longnecker | B62K 21/125 74/551.8 |
| 2011/0024470 A1* | 2/2011 | Hajarian | B60R 11/0258 224/276 |
| 2011/0167953 A1* | 7/2011 | Jan | B62D 1/06 74/552 |
| 2014/0231479 A1* | 8/2014 | VanZanten | B62K 21/125 224/414 |
| 2015/0197306 A1* | 7/2015 | Denby | B62K 21/26 74/551.9 |
| 2018/0022292 A1* | 1/2018 | Lowell | B60R 11/02 224/276 |
| 2018/0154921 A1* | 6/2018 | Bonello | B62D 1/06 |
| 2019/0239431 A1* | 8/2019 | Kastelic, Jr. | B62D 11/006 |
| 2021/0122405 A1* | 4/2021 | Jo | B62D 1/08 |
| 2021/0323594 A1* | 10/2021 | Helmstetter | B62D 1/04 |

FOREIGN PATENT DOCUMENTS

| | | | | |
|---|---|---|---|---|
| DE | 102008045918 A1 | * | 5/2009 | ............ B62D 1/06 |
| DE | 102018216137 A1 | * | 3/2020 | |
| DE | 102019108775 A1 | * | 10/2020 | |
| DE | 102019133728 B4 | * | 9/2021 | ............ B62D 1/06 |
| EP | 3050775 B1 | * | 5/2018 | ............ B62D 1/06 |

OTHER PUBLICATIONS

Machine Translation of DE 10 2019 108 775.*
Machine Translation of DE 10227196.*
Machine Translation of DE 10 2005 044 289.*
Machine Translation of DE 10 2019 133 728.*
Machine Translation of DE 10 2008 045 918.*
"Tesla Model S gets an aftermarket yoke replacement," Byron Hurd, Published Jan. 13, 2022, Autoblog.com, url:<https://www.autoblog.com/2022/01/13/tesla-yoke-aftermarket-replacement/>.*
"Here's why Tesla's Yoke-Style Steering May Not Be the Best Idea Ever," Jay Ramey, Published Feb. 10, 2021, Autoweek.com, url:<https://www.autoweek.com/news/green-cars/a35462117/why-teslas-yoke-style-steering-not-the-best-idea/>.*
"2022 Tesla Model S Plaid Steering Yoke Review: The Pros and Cons," Christian Seabaugh, Published Jun. 29, 2021, Motortrend.com, url:<https://www.motortrend.com/reviews/2022-tesla-model-s-plaid-steering-yoke-wheel-review/>.*
Machine Translation of EP 3050775.*

* cited by examiner

VEHICLE STEERING ATTACHMENT

FIELD OF DISCLOSURE

The present disclosure generally relates to Vehicle Steering Devices.

BACKGROUND

In some modern vehicles, traditional steering wheels are replaced with other types of vehicle operating equipment. One such example is a "yoke" in a Tesla Model S™ in place of a traditional steering wheel. The yoke and other types of vehicle operating equipment may be undesirable to some. For example, when compared to traditional circular steering wheels, the yoke may require the operator of the vehicle to place their hands in an uncomfortable, or less desirable position when compared to a steering wheel. Furthermore, the operation of the yoke may present an increased risk for error if the operator is not accustomed to performing steering actions with that yoke. A means to convert a yoke or other types of vehicle operating equipment used in place of a steering wheel, into equipment more resembling a steering wheel is needed.

BRIEF OVERVIEW

This brief overview is provided to introduce a selection of concepts in a simplified form that are further described below in the Detailed Description. This brief overview is not intended to identify key features or essential features of the claimed subject matter. Nor is this brief overview intended to be used to limit the claimed subject matter's scope.

The present disclosure provides a vehicle steering attachment configured to augment a vehicle steering device, the vehicle steering attachment comprising: : a first end configured to secure to a left handle of the vehicle steering device; a second end configured to secure to a right handle of the vehicle steering device; and a middle portion disposed between the first end and the second end, wherein the left handle and the right handle connect to a center section.

The present disclosure further provides a vehicle steering attachment comprising: a steering portion configured to augment a vehicle steering device, the vehicle steering device comprising: a center section, a left handle secured to the center section, and a right handle secured to the center section; and a plurality of securing means configured to secure the steering portion to the vehicle steering device.

The present disclosure further provides an augmented vehicle steering device comprising: a vehicle steering device comprising: a center section, a left handle secured to the center section, and a right handle secured to the center section; and a vehicle steering attachment secured to the vehicle steering device, the vehicle steering attachment comprising: a first end secured to the left handle, a second end secured to the right handle, and a middle portion disposed between the first end and the second end.

The present disclosure further provides an augmented vehicle steering device comprising: a vehicle steering device comprising: a center section, a left handle secured to the center section, and a right handle secured to the center section; and a vehicle steering attachment secured to the vehicle steering device, the vehicle steering attachment comprising: a first end secured to the left handle, a second end secured to the right handle, and a middle portion disposed between the first end and the second end.

Both the foregoing brief overview and the following detailed description provide examples and are explanatory only. Accordingly, the foregoing brief overview and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicant. In addition, the drawings may contain other marks owned by third parties and are being used for illustrative purposes only. All rights to various trademarks and copyrights represented herein, except those belonging to their respective owners, are vested in and the property of the Applicant. The Applicant retains and reserves all rights in its trademarks and copyrights included herein, and grants permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure. In the drawings.

DETAILED DESCRIPTION

Figure 1:
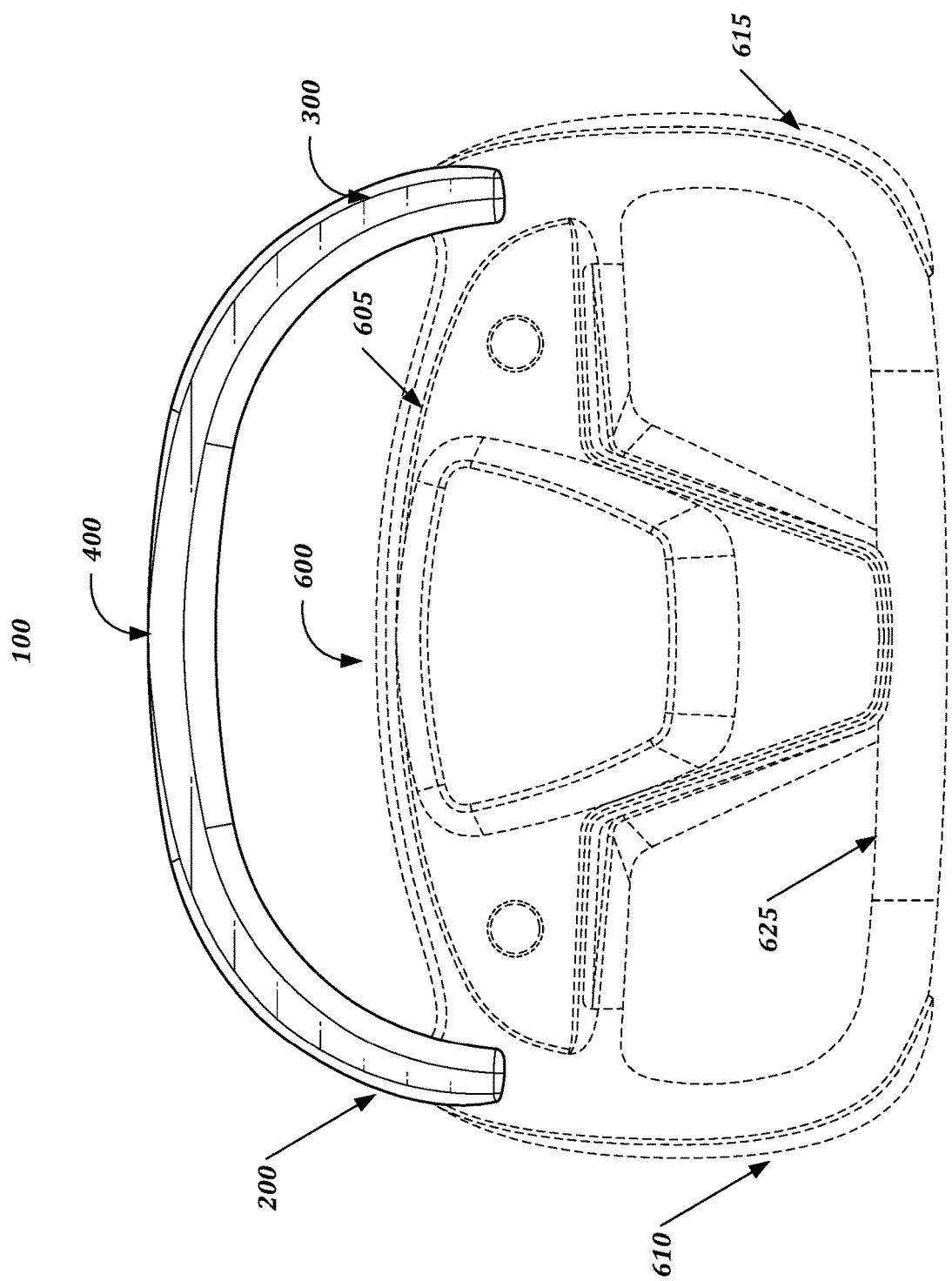
FIG. 1 is a front view of a vehicle steering attachment 100.
Figure 2:
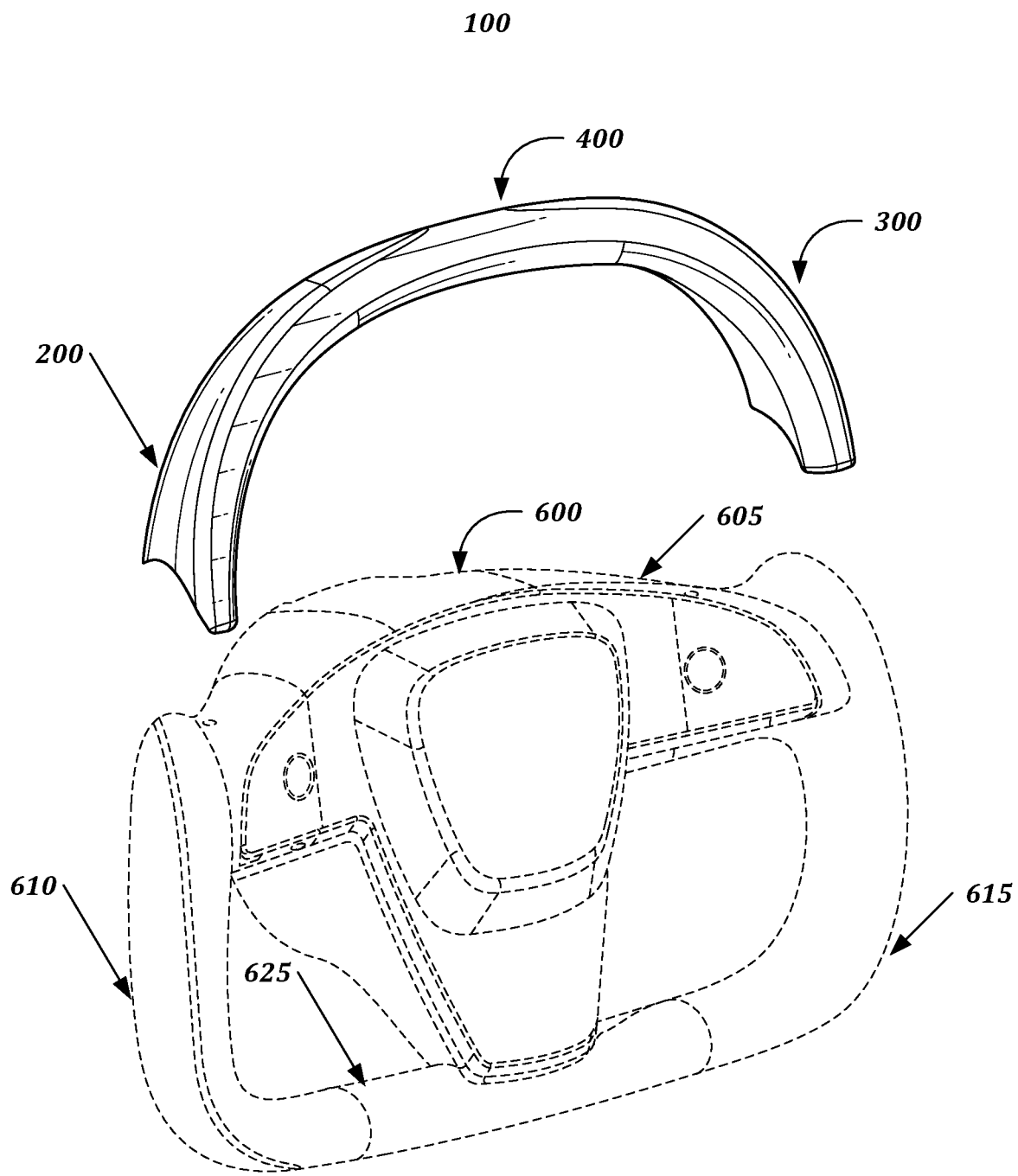
FIG. 2 is a perspective view of the vehicle steering attachment 100.
Figure 3:
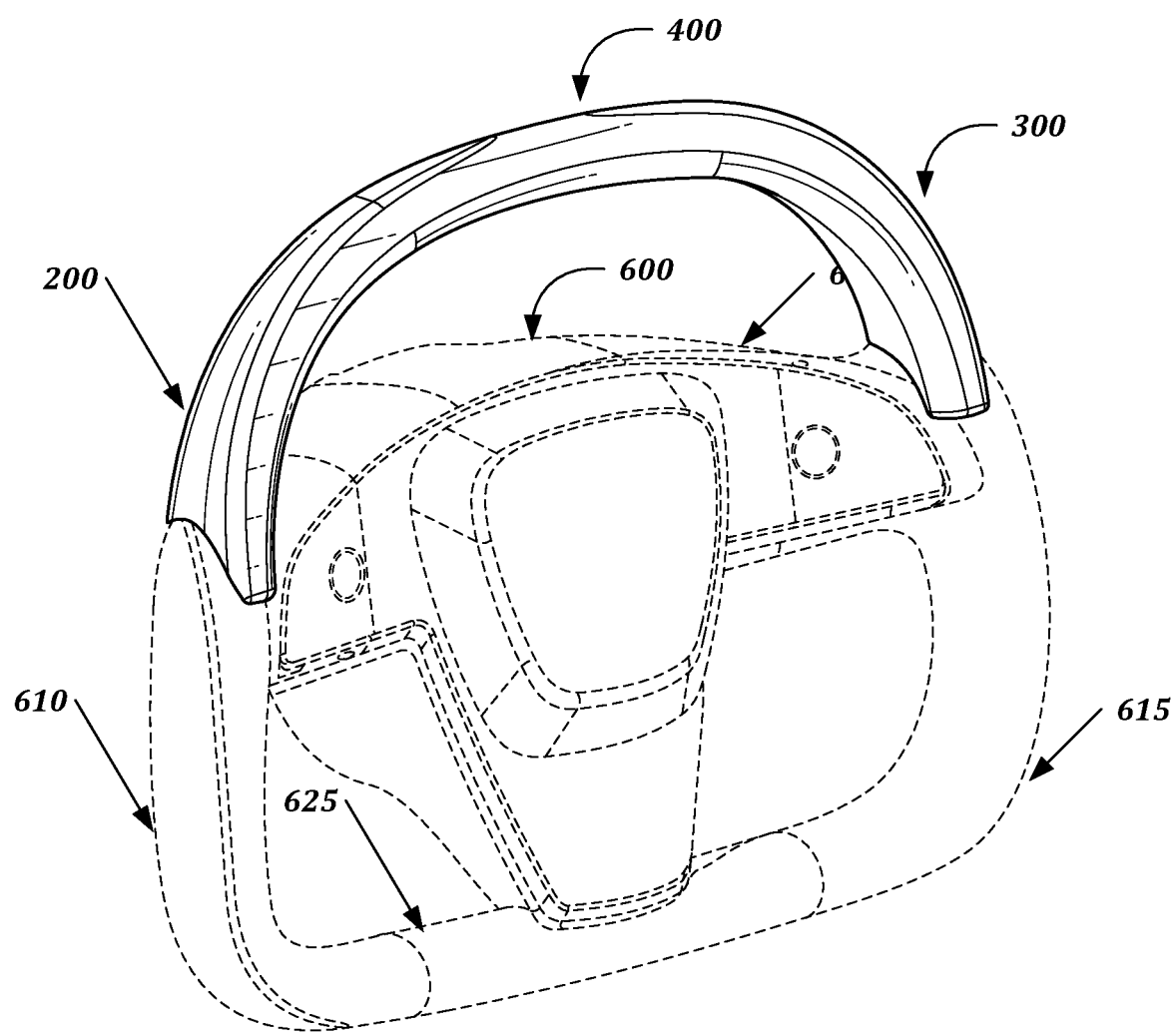
FIG. 3 is another perspective view of the vehicle steering attachment 100.
Figure 4:
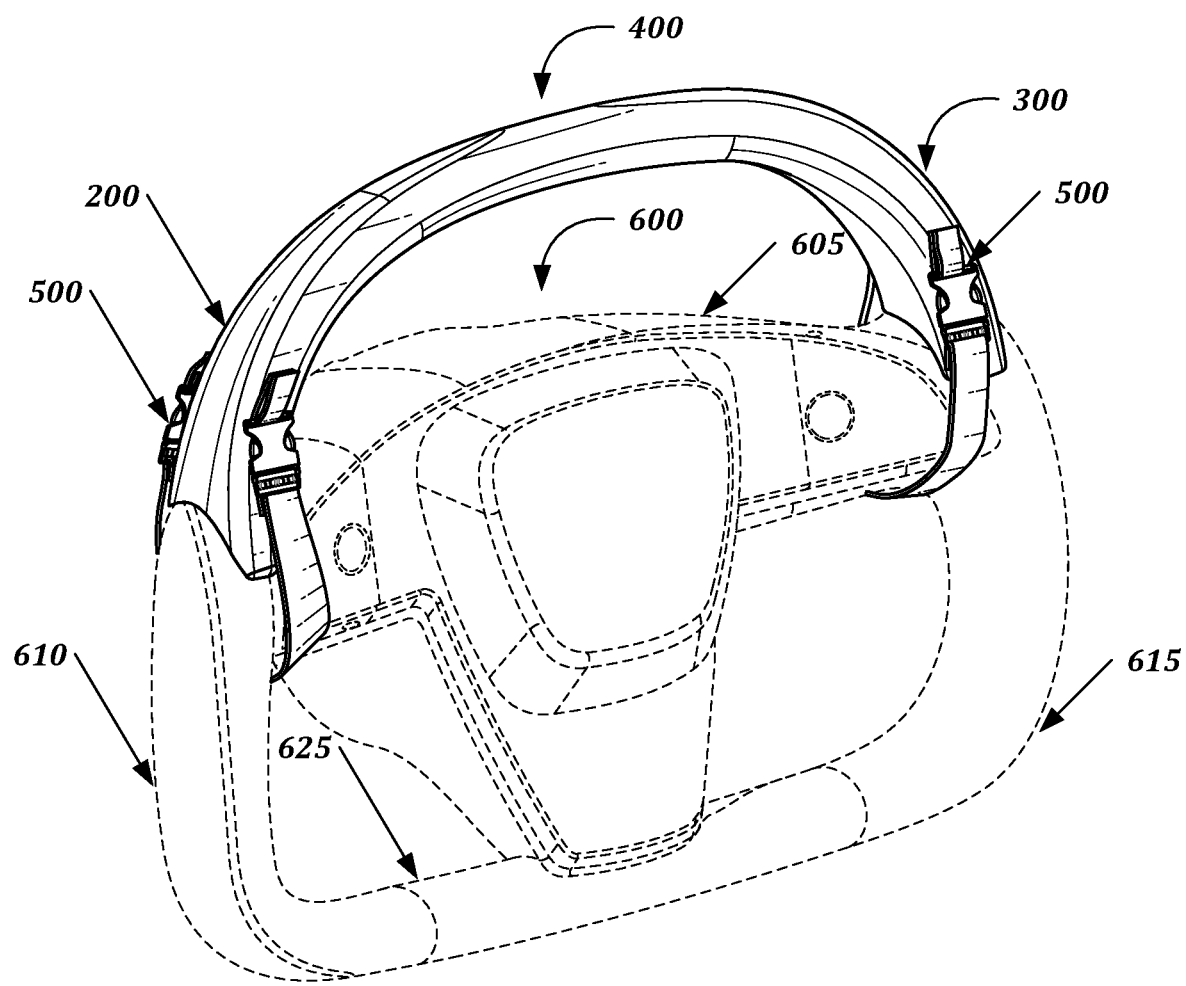
FIG. 4 is a perspective view of an alternate embodiment of the vehicle steering attachment 100.
Figure 5:
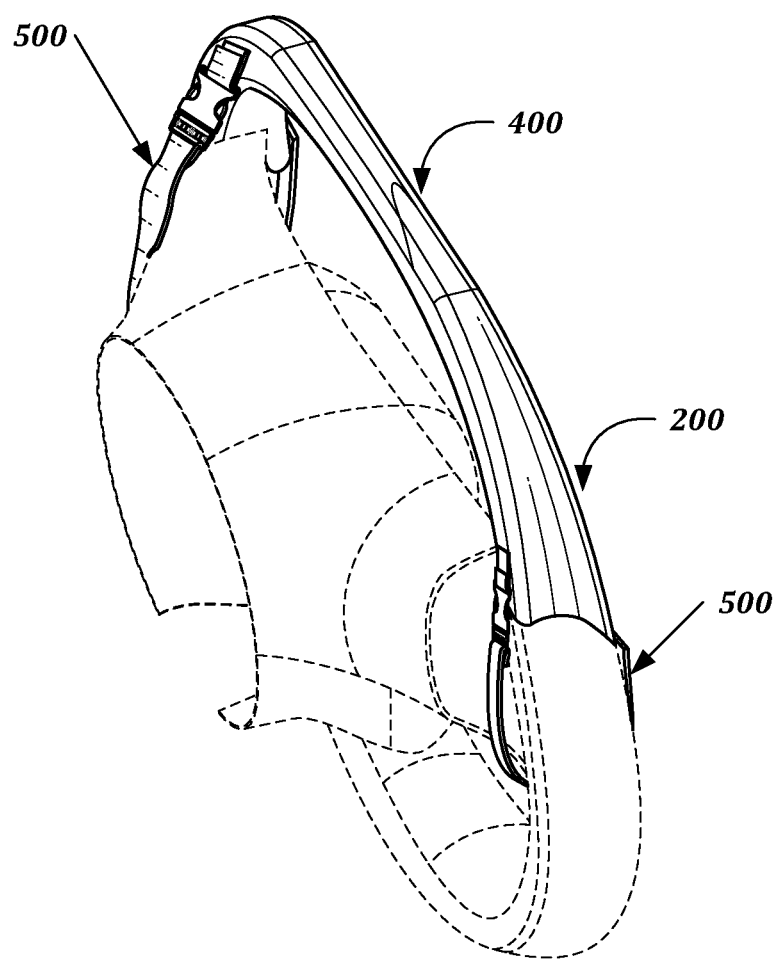
FIG. 5 is a back perspective view of the vehicle steering attachment 100.
Figure 6:
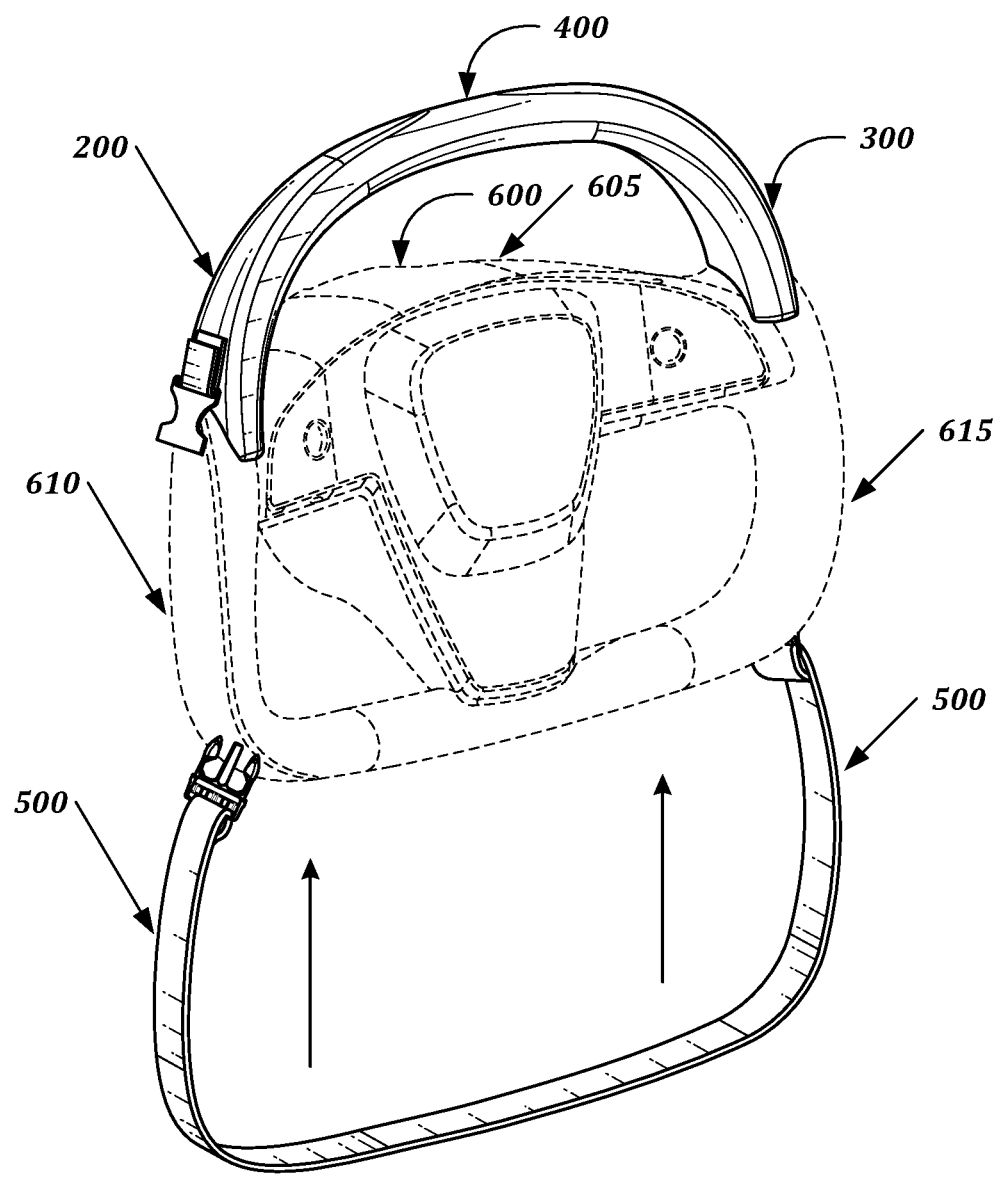
FIG. 6 is another perspective view of the vehicle steering attachment 100.
Figure 7:
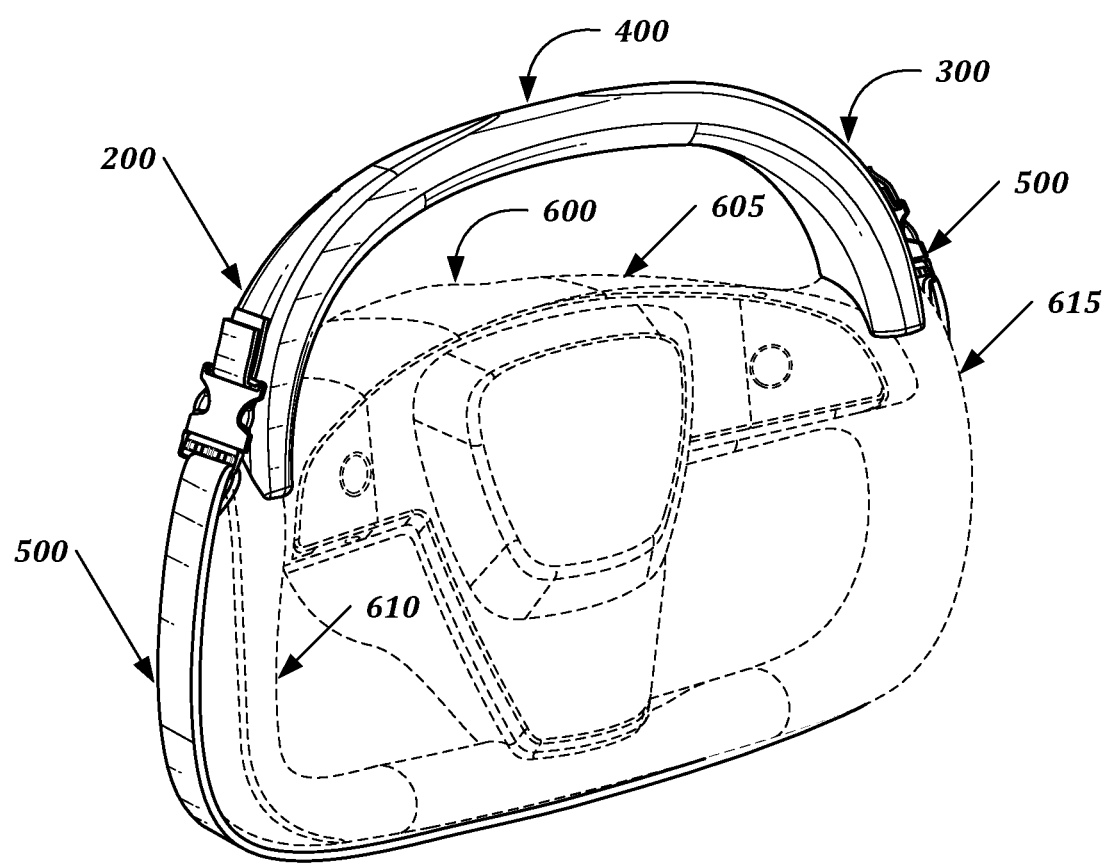
FIG. 7 is another perspective view of the vehicle steering attachment 100.
Figure 8:
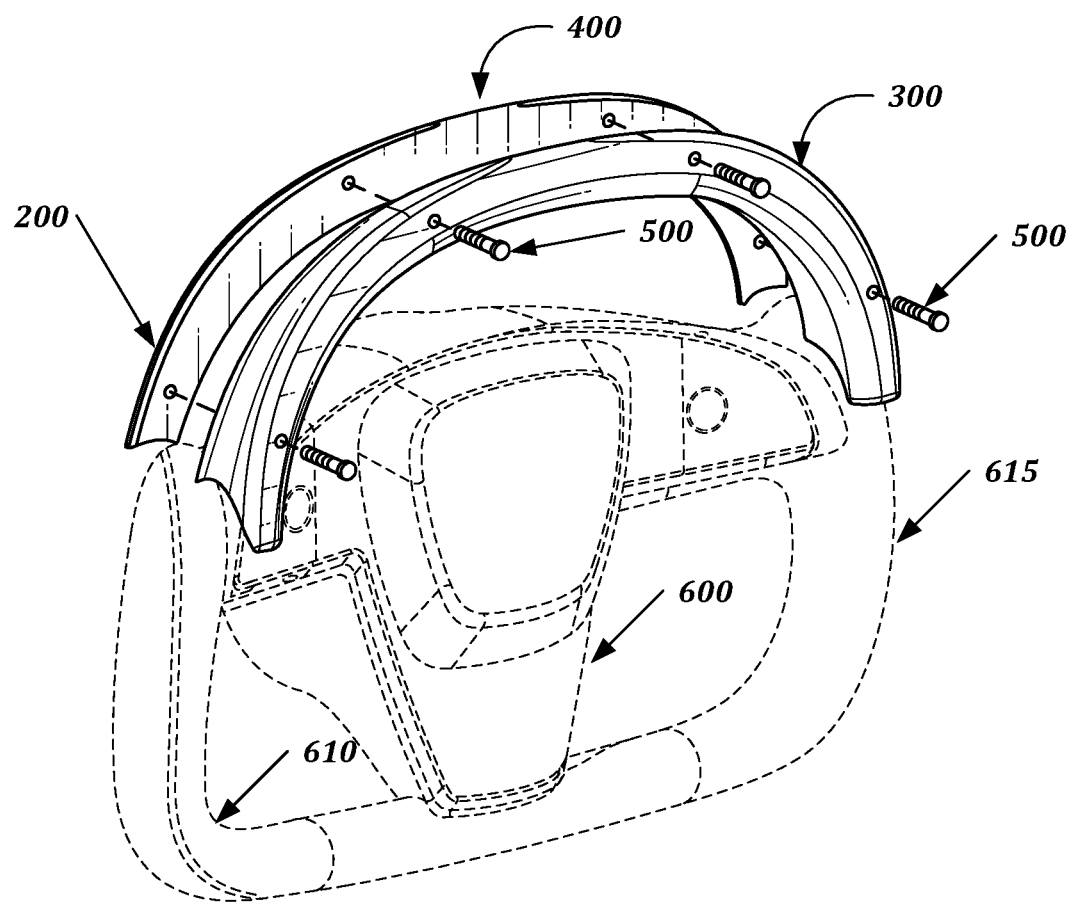
FIG. 8 is a perspective view of an alternate embodiment of the vehicle steering attachment 100.
Figure 9:
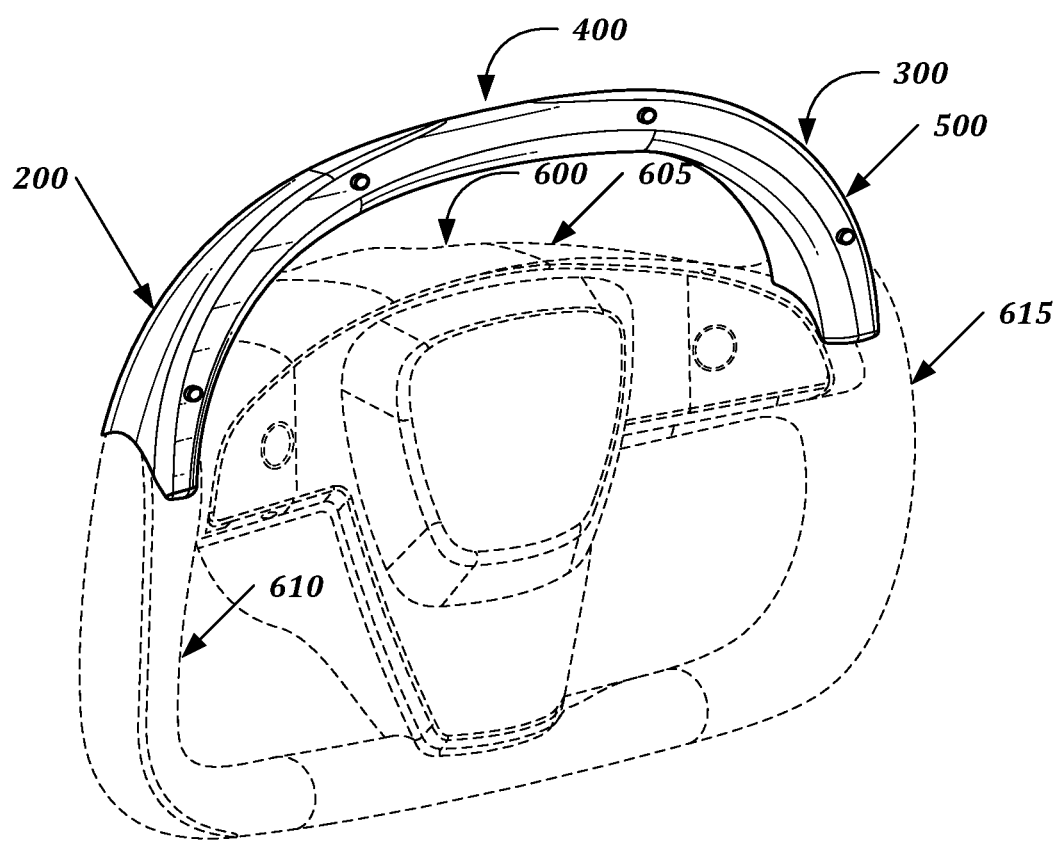
FIG. 9 is another perspective view of the vehicle steering attachment 100.
Figure 10:
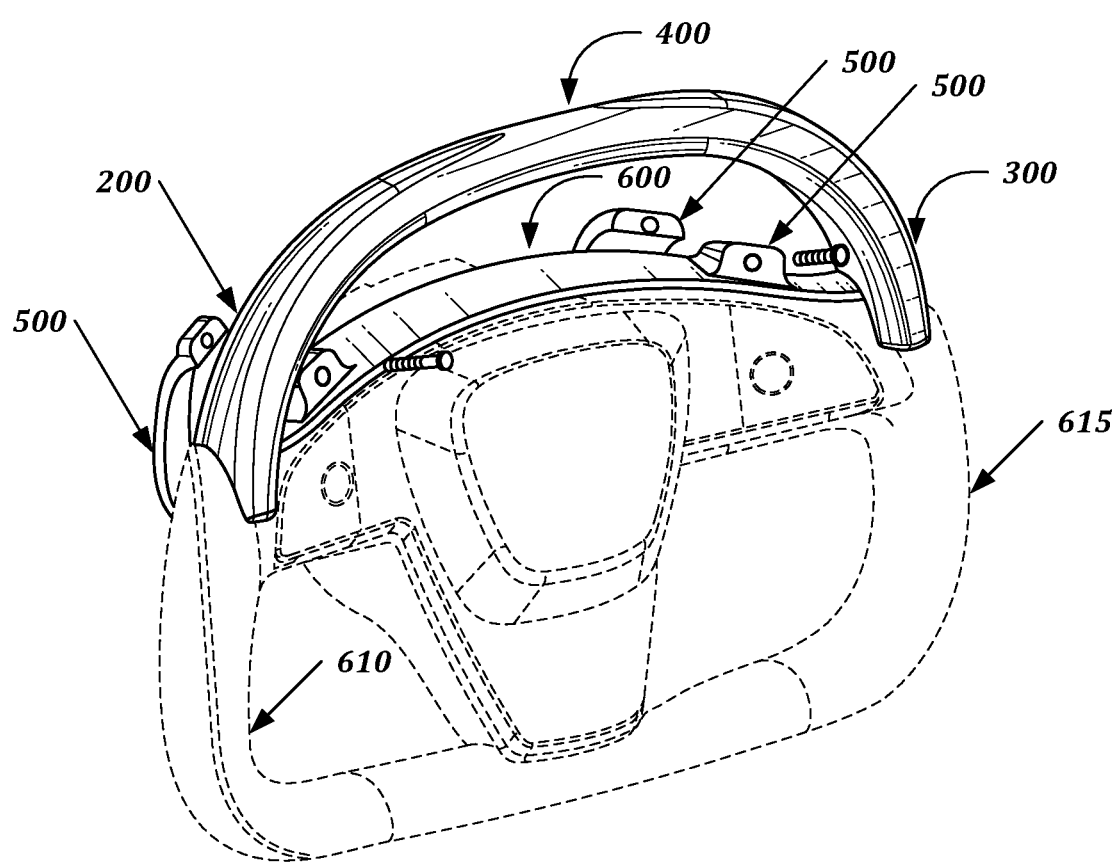
FIG. 10 is a perspective view of an alternate embodiment of the vehicle steering attachment 100.
Figure 11:
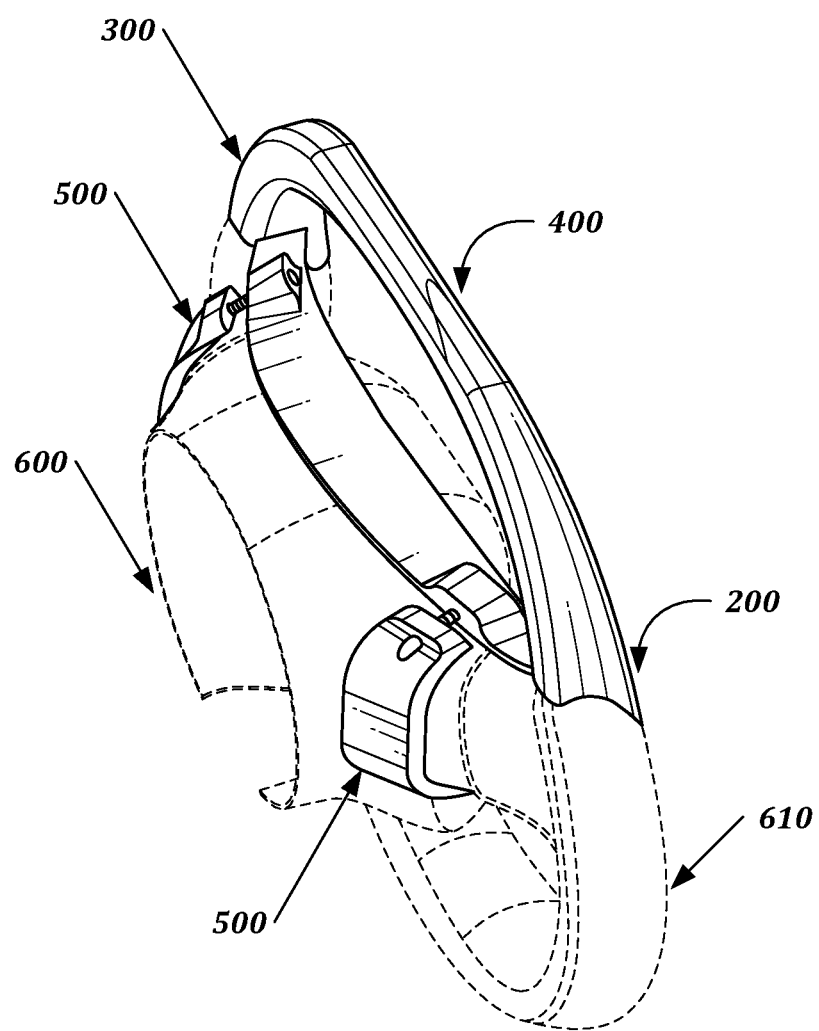
FIG. 11 is a back perspective view of the vehicle steering attachment 100.
Figure 12:
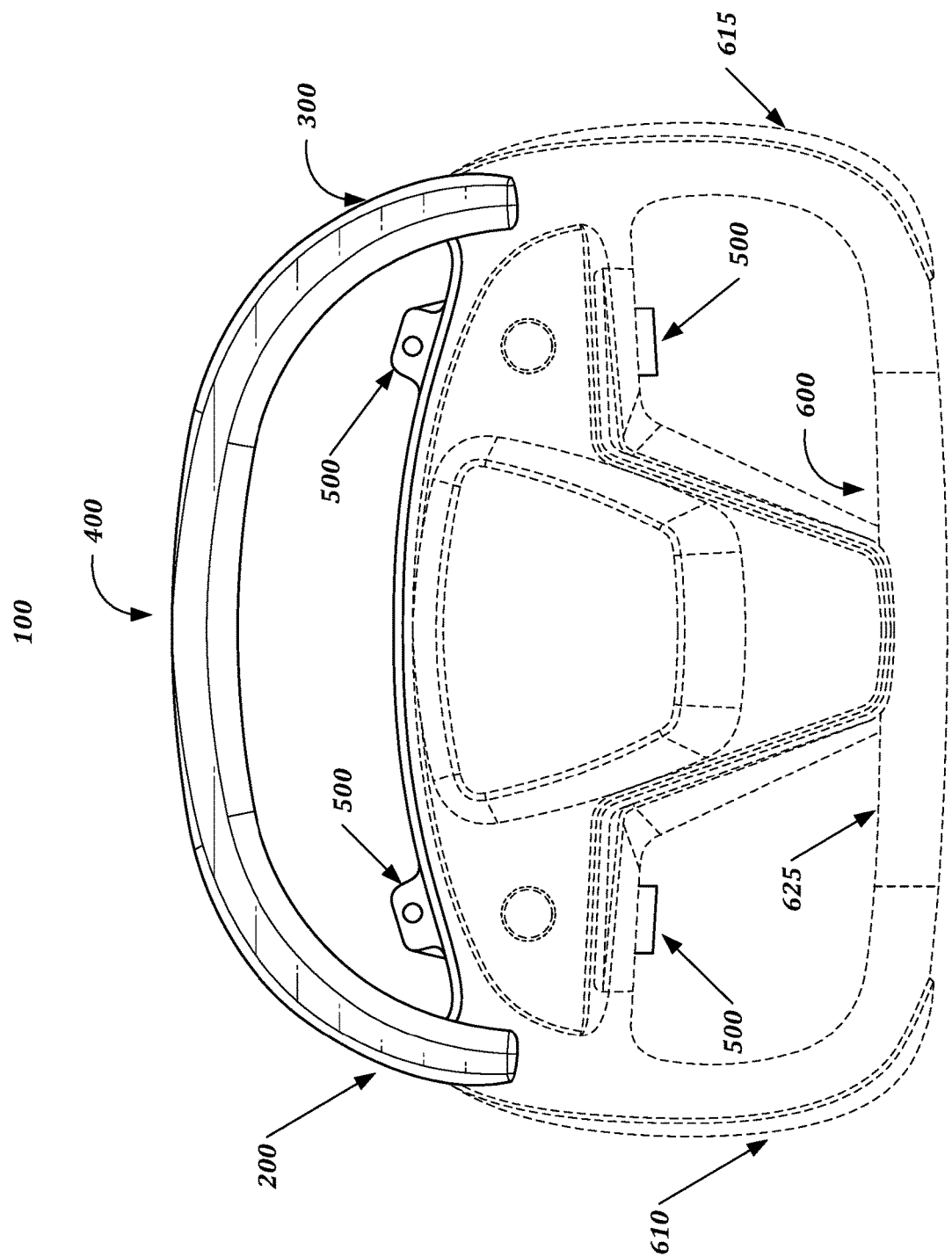
FIG. 12 is another a front view of a vehicle steering attachment 100.
Figure 13:
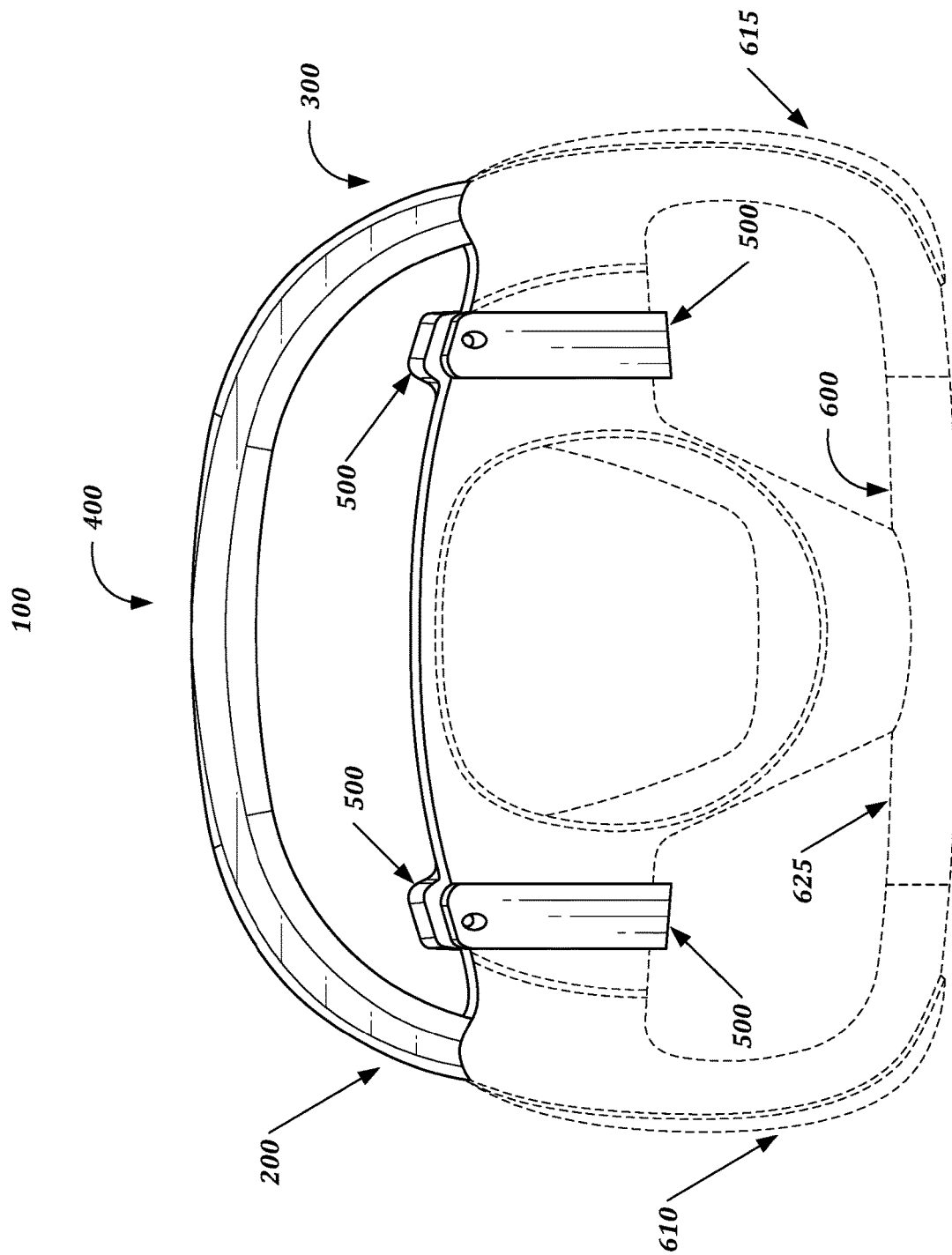
FIG. 13 is a front view of a vehicle steering attachment 100.
Figure 14:
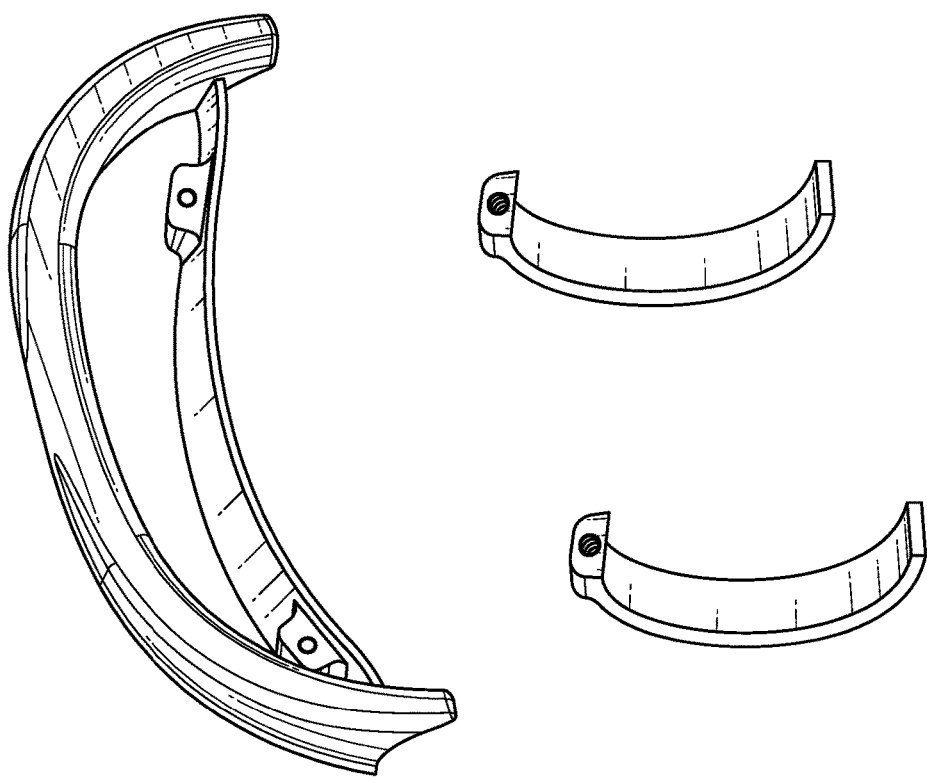
FIG. 14 is a perspective view of one or more securing portions 500.
Figure 15:
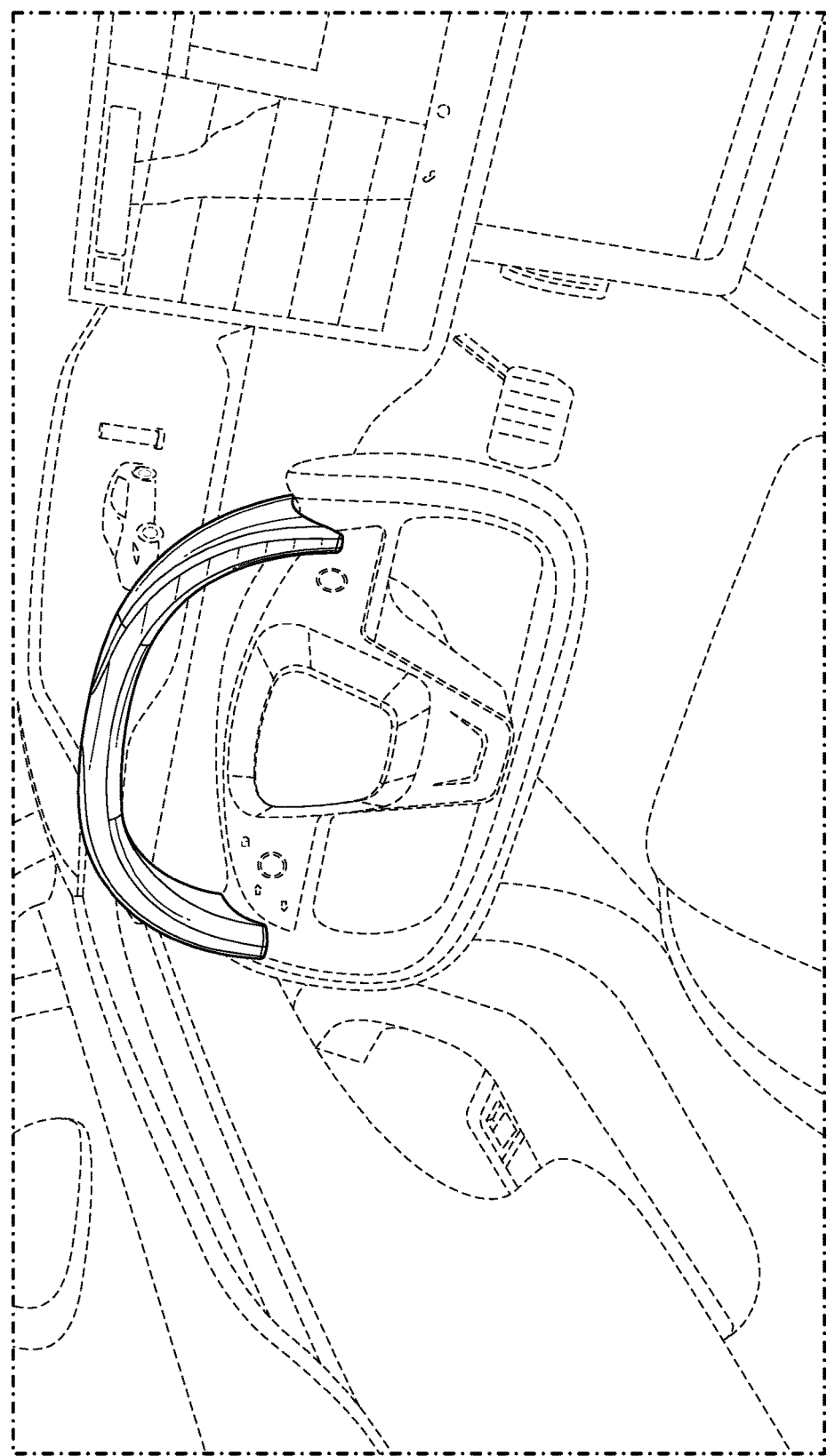
FIG. 15 is a perspective view of the vehicle steering attachment 100 in an environment consistent with the present disclosure.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Regarding applicability of 35 U.S.C. § 112, ¶6, no claim element is intended to be read in accordance with this statutory provision unless the explicit phrase "means for" or "step for" is actually used in such claim element, whereupon this statutory provision is intended to apply in the interpretation of such claim element.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting upon the subjected matter disclosed under the header.

The present disclosure includes many aspects and features. Moreover, while many aspects and features relate to, and are described in, the context of vehicle steering devices embodiments of the present disclosure are not limited to use only in this context.

I. Apparatus Overview

This overview is provided to introduce a selection of concepts in a simplified form that are further described below. This overview is not intended to identify key features or essential features of the claimed subject matter. Nor is this overview intended to be used to limit the claimed subject matter's scope.

Embodiments of the present disclosure may comprise methods, systems, and components comprising, but not limited to, at least one of the following:

A. A First End 200;
B. A Second End 300;
C. A Middle Portion 400;
D. One or More Securing Portions 500; and In some embodiments, the present disclosure may provide an additional set of components for further facilitating the system. The additional set of components may comprise, but not be limited to:

E. A Vehicle Steering Device 600.

It is noted that "vehicle steering device 600" may be used interchangeably with "yoke 600."

Details with regards to each component is provided below. Although components are disclosed with specific functionality, it should be understood that functionality may be shared between components, with some functions split between components, while other functions duplicated by the components. Furthermore, the name of the component should not be construed as limiting upon the functionality of the component. Moreover, each stage disclosed within each component can be considered independently without the context of the other stages within the same component or different components. Each stage may contain language defined in other portions of this specifications. Each stage disclosed for one component may be mixed with the operational stages of another component. In the present disclosure, each stage can be claimed on its own and/or interchangeably with other stages of other components.

The following depicts an example of a method of a plurality of methods that may be performed by at least one of the aforementioned components. Various hardware components may be used at the various stages of operations disclosed with reference to each component. For example, although methods may be described to be performed by a single apparatus, it should be understood that, in some embodiments, different operations may be performed by different apparatuses in operating in conjunction with each other. For example, attachment 100 may be employed in the performance of some or all of the stages disclosed with regard to the methods. Similarly, one apparatus may be employed in the performance of some or all of the stages of the methods. As such, the apparatus 100 may comprise at least one of the architectural components disclosed herein.

Furthermore, although the stages of the following example method are disclosed in a particular order, it should be understood that the order is disclosed for illustrative purposes only. Stages may be combined, separated, reordered, and various intermediary stages may exist. Accordingly, it should be understood that the various stages, in various embodiments, may be performed in arrangements that differ from the ones claimed below. Moreover, various stages may be added or removed without altering or deterring from the fundamental scope of the depicted methods and systems disclosed herein.

Both the foregoing overview and the following detailed description provide examples and are explanatory only. Accordingly, the foregoing overview and the following detailed description should not be considered to be restrictive. Further, features or variations may be provided in addition to those set forth herein. For example, embodiments may be directed to various feature combinations and sub-combinations described in the

II. System Configuration

One possible embodiment of a component of the system may be provided by the Velossa Tech™ suite of products and services provided by Velossa Tech Engineering, Inc.

In some embodiments, the attachment 100 may be configured to convert a yoke and/or another type of vehicle steering device into a steering wheel, illustrated at least in FIGS. 1-13 and 15.

In some embodiments, the attachment 100 may be adjustable such that various portions and/or ends of the apparatus 100 may be positioned on a plurality of portions of a vehicle steering device 600.

In some embodiments, the attachment 100 may be curved, arced, elliptical, and/or substantially semicircular in shape. In some embodiments, the attachment 100 may, when secured to the steering apparatus, form a substantially continuous loop. In some embodiments, the attachment 100 may, when secured to the steering apparatus, form a substantially continuous wheel. In some embodiments, the circumference of the apparatus 100 may be dimensioned substantially the same as a portion of the circumference of the vehicle steering apparatus 600 and/or a traditional steering wheel.

In other embodiments, the attachment 100 may be substantially rectangular, triangular, hexagonal, octagonal, and/or any other type of geometric shape.

In some embodiments, the attachment 100 may, when secured to the steering apparatus, form a substantially continuous shape. In some embodiments, the attachment 100 may be adjustable in the X (length), Y (height), and/or Z (depth) direction.

Accordingly, embodiments of the present disclosure provide the attachment 100 comprised of a distributed set of components, including, but not limited to:

A. First End 200

FIGS. 1-13 illustrate a first end 200 of the apparatus 100 consistent with an embodiment of the present disclosure. The first end 200 may be used to secure to the yoke 600. In some embodiments, the first end 200 may be arced and/or curved in shape. In other embodiments, the first end 200 may be substantially linear.

In some embodiments, the first end 200 may secure to a left handle 605 of the yoke 600, illustrated at least in FIGS. 1-13. The first end 200 may secure to the left handle 605 of the yoke 600 via at least a portion of one or more securing portions 500.

In some embodiments, the first end 200 may secure to the middle portion 400. In some embodiments, the first end 200 may secure to a left side of the middle portion 400. In some embodiments, the first end 200 may form a continuous arc and/or be substantially continuous when traversing the first end 200 to the middle portion 400 and vice versa.

In some embodiments, the first end 200 may be vertically oriented relative to the middle portion 400.

In some embodiments, the first end 200 may be oriented in and/or span the 1 o'clock-3 o'clock position of a traditional steering wheel. From one side of the yoke to the other side of the yoke.

B. Second End 300

FIGS. 1-13 illustrate a second end 300 consistent with an embodiment of the present disclosure.

The second end 300 may be used to secure to a second portion of a vehicle steering device 600. In some embodiments, the second end 300 may be arced and/or curved in shape. In other embodiments, the second end 300 may be substantially linear.

In some embodiments, the second end 300 may secure to a right handle 610 of the yoke 600, illustrated at least in FIGS. 1-13. The second end 300 may secure to the right handle 610 of the yoke 600 via at least a portion of one or more securing portions 500.

In some embodiments, the second end 300 may secure to the middle portion 400. In some embodiments, the second end 300 may secure to a right side of the middle portion 400. In some embodiments, the second end 300 may form a continuous arc and/or be substantially continuous when traversing the second end 300 to the middle portion 400 and vice versa.

In some embodiments, the second end 300 may arc in the opposite direction as the first end 200.

In some embodiments, the second end 300 may be vertically oriented relative to the middle portion 400.

In some embodiments, the second end 300 may be oriented in and/or span the 9 o'clock-11 o'clock position of a traditional steering wheel.

C. Middle Portion 400

FIGS. 1-13 illustrate a middle portion 400 consistent with an embodiment of the present disclosure.

In some embodiments, the middle portion 400 may be disposed between the first end 200 and the second end 300. In some embodiments, the first end 200 may be arced and/or curved in shape. In other embodiments, the middle portion 400 may be substantially linear and/or geometrical in shape.

In some embodiments, the middle portion 400 may be oriented in and/or span the 10 o'clock-2 o'clock position of a traditional steering wheel.

D. Securing Portion 500

FIGS. 4-14 illustrate securing portion 500 consistent with an embodiment of the present disclosure. The securing portion 500 may be used to secure the attachment 100 to at least a portion the vehicle steering device 600. The securing portion 500 may be used to secure the first portion 200, at least a portion the vehicle steering device 600. The securing portion 500 may be used to secure the second portion 300, at least a portion the vehicle steering device 600. The securing portion 500 may be used to secure the middle portion 400, at least a portion the vehicle steering device 600.

The securing portion 500 may be embodied as, but not limited to, for example, one or more of the following:
  a. a fitting,
  b. an insert,
  c. an adhesive,
  d. a mechanical fastener,
  e. a spring-loaded locking,
  f. a magnet,
  g. a threading,
  h. a friction fit,
  i. a hook and groove snap-fit,
  j. a twist-lock,
  k. a tab and groove,
  l. a tab and slot,
  m. a latch,
  n. a strap,
  o. a pin,
  p. a clasp,
  q. a screwing mechanism,
  r. a click-lock mechanism,
  s. a friction mechanism,
  t. an interlocking mechanism, and/or
  u. combinations thereof.

E. Vehicle Steering Device 600

FIG. 1 illustrates vehicle steering device 600 consistent with an embodiment of the present disclosure.

In some embodiments, the vehicle steering device 600 may be embodied as, but not limited to, for example:
  a. a yoke,
  b. one or more sidesticks,
  c. one or more joysticks, and/or
  d. any other type of vehicle steering device.

In some embodiments, the vehicle steering device 600 may comprise a center section 605, as illustrated at least in FIGS. 1-13. The center section 605 may be oriented between a left handle 610 and a right handle 615, as illustrated at least in FIGS. 1-13. In some embodiments, the center section 605 may secure and/or be in operative communication with a steering column of a vehicle.

In some embodiments, the vehicle steering device 600 may comprise the left handle 610. In some embodiments, the left handle 610 may be oriented substantially vertically and/or at any other suitable angle. In some embodiments, the left handle 610 may be oriented to the left of the center section 605. In some embodiments, the left handle 610 may be secured directly to the center section 605. In other embodiments, the left handle 610 may be secured to the center section 605 via a substantially horizontal top section 620. In some embodiments, the left handle 610 may be oriented orthogonally to the substantially horizontal top section 620.

In some embodiments, the vehicle steering device 600 may comprise the right handle 615. The right handle 615 may be oriented substantially vertically and/or at any other suitable angle. In some embodiments, the right handle 615 may be oriented to the right of the center section 605. In some embodiments, the right handle 615 may be secured directly to the center section 605. In other embodiments, the right handle 615 may be secured to the center section 605 via the substantially horizontal top section 620. In some embodiments, the right handle 615 may be oriented orthogonally to the substantially horizontal top section 620.

In other embodiments, the right handle 615 may be secured to the left handle 610 via a substantially horizontal bottom section 625, illustrated at least in FIGS. 1-13. The substantially horizontal bottom section 625 may be disposed below the center section 605.

III. Apparatus Use

Embodiments of the present disclosure provide a system operative by a set of methods comprising instructions configured to operate the aforementioned components in accordance with the methods. The following depicts an example of a method of a plurality of methods that may be performed by at least one of the aforementioned components. Various hardware components may be used at the various stages of operations disclosed with reference to each component.

For example, although methods may be described to be performed by a single component, it should be understood that, in some embodiments, different operations may be performed by different components in operative relation with one another. For example, an apparatus may be employed in the performance of some or all of the stages disclosed with regard to the methods. As such, the apparatus may comprise at least one architectural component disclosed herein.

Furthermore, although the stages of the following example method are disclosed in a particular order, it should be understood that the order is disclosed for illustrative purposes only. Stages may be combined, separated, reordered, and various intermediary stages may exist. Accordingly, it should be understood that the various stages, in various embodiments, may be performed in arrangements that differ from the ones claimed below. Moreover, various stages may be added or removed from the without altering or deterring from the fundamental scope of the depicted methods and systems disclosed herein.

Figure 16:
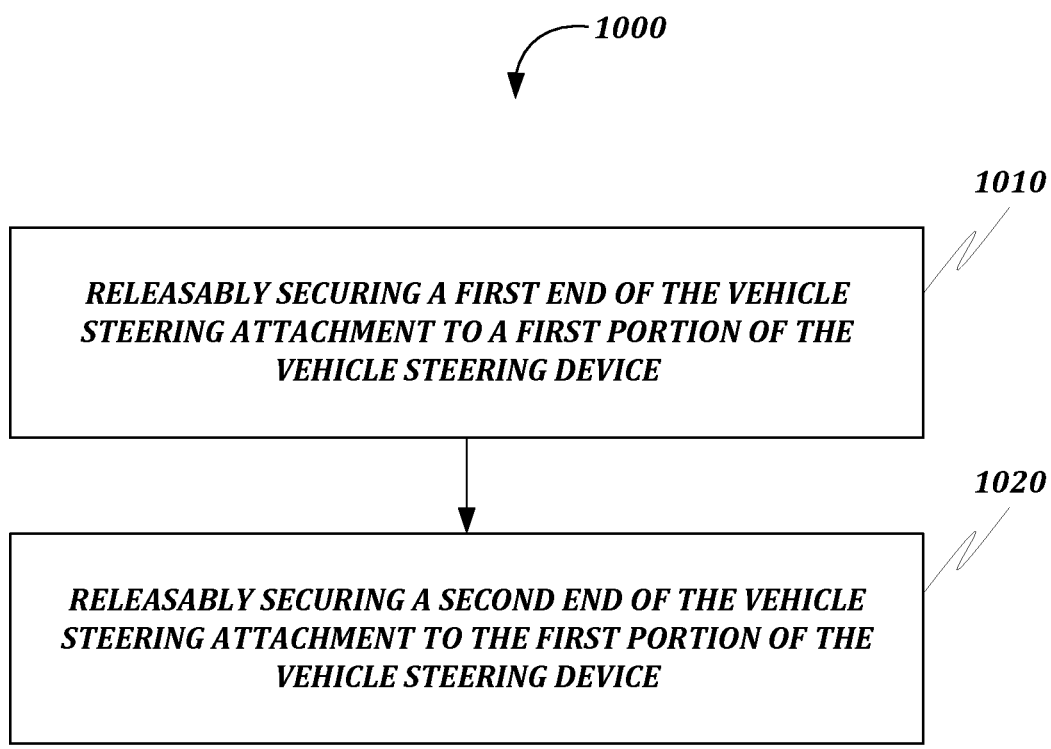
FIG. 16 is flowchart of a method 1000 for releasably securing a vehicle steering attachment to a vehicle steering device.

Consistent with embodiments of the present disclosure, a method 1000 for releasably securing a vehicle steering attachment to a vehicle steering device may be performed by at least one of the aforementioned components, illustrated at least in FIG. 16. The method 1000 may comprise the following stages:

1. 1010—releasably securing a first end of the vehicle steering attachment to a left handle of the vehicle steering device, the securing comprising:
    a. Positioning the first end of the vehicle steering attachment flush onto a top portion of the left handle of the vehicle steering device,
    b. Securing a distal end of a first strap to a front portion of the first end of the vehicle steering attachment, c. Looping the first strap under the left handle of the vehicle steering attachment,
d. Securing another distal end of the first strap to a back portion of the first end of the vehicle steering attachment,
e. Wherein the first end is the leftmost portion of the vehicle steering attachment, and
f. (Optional) wherein the vehicle steering device is a yoke.

2. 1020—releasably securing a second end of the vehicle steering attachment to a right handle of the vehicle steering device, the second end being the rightmost portion of the vehicle steering attachment.
   a. Positioning the second end of the vehicle steering attachment flush onto a top portion of the right handle of the vehicle steering device,
   b. Securing a distal end of a second strap to a front portion of the second end of the vehicle steering attachment,
   c. Looping the second strap under the right handle of the vehicle steering attachment, and
   d. Securing another distal end of the second strap to a back portion of the second end of the vehicle steering attachment,
   e. Wherein the second end is the rightmost portion of the vehicle steering attachment, and
   f. (Optional) wherein the vehicle steering device is a yoke.

3. (Variation)
   a. Splitting the vehicle steering attachment such that the vehicle steering attachment comprises a front portion of the vehicle steering attachment and a rear portion of the vehicle steering attachment,
   b. Positioning the front portion of the vehicle steering attachment flush against a front side of the vehicle steering device,
   c. Positioning the rear portion of the vehicle steering attachment flush against a back side of the vehicle steering device, and
   d. Securing the front portion of the vehicle steering attachment to the rear portion of the vehicle steering attachment such that the vehicle steering attachment is releasably securing to the vehicle steering device.
      i. (Variation) wherein the front portion of the vehicle steering attachment is secured to the rear portion of the vehicle steering attachment via at least one of the following:
         1. Bolt,
         2. Screw, and
         3. Any of the aforementioned securing means and/or mechanisms.

4. (Variation)
   a. Positioning the first end of the vehicle steering attachment flush onto a top portion of the left handle of the vehicle steering device,
   b. Securing a clamp onto the first end of the vehicle steering attachment and the top portion of the left handle of the vehicle steering device,
   c. Positioning the second end of the vehicle steering attachment flush onto a top portion of the right handle of the vehicle steering device, and
   d. Securing another clamp onto the second end of the vehicle steering attachment and the top portion of the right handle of the vehicle steering device.

5. (Variation)
   a. Positioning the first end of the vehicle steering attachment flush onto a top portion of the left handle of the vehicle steering device,
   b. Positioning the second end of the vehicle steering attachment flush onto a top portion of the right handle of the vehicle steering device,
   c. Securing a clamp onto the vehicle steering device, the clamp spanning the lower perimeter of the vehicle steering device,
   d. Securing a first distal end of the clamp to the first end of the vehicle steering attachment, and
   e. Securing a second distal end of the clamp to the second end of the vehicle steering attachment.

Figure 17:
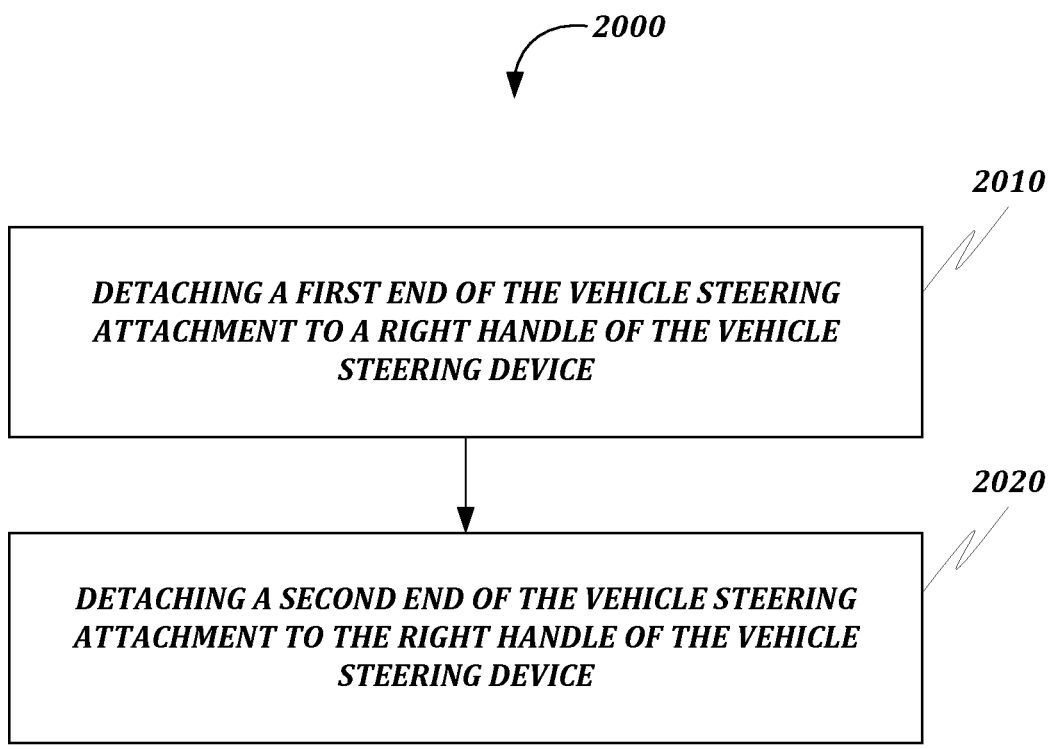
FIG. 17 is flowchart of a method 2000 for detaching a vehicle steering attachment to a vehicle steering device.

Consistent with embodiments of the present disclosure, a method 2000 for releasably detaching a vehicle steering attachment from a vehicle steering device may be performed by at least one of the aforementioned components, illustrated at least in FIG. 17. The method 2000 may comprise the following stages:

6. 2010—detaching a first end of a vehicle steering attachment from a left handle of a vehicle steering device, the detaching comprising:
   a. detaching a distal end of a first strap (and/or clamp) from a front portion of the first end of the vehicle steering attachment,
   b. unlooping the first strap (and/or clamp) under the left handle of the vehicle steering attachment,
   c. removing the first end of the vehicle steering attachment from the left handle of the vehicle steering device, and
   d. wherein the first end is the leftmost portion of the vehicle steering attachment; and 7. 2020—detaching a second end of the vehicle steering attachment from a right handle of the vehicle steering device, the detaching comprising:
   a. detaching a distal end of a second strap (and/or clamp) from a front portion of the second end of the vehicle steering attachment,
   b. unlooping the second strap (and/or clamp) under the right handle of the vehicle steering attachment,
   c. removing the second end of the vehicle steering attachment from the right handle of the vehicle steering device, and
   d. wherein the second end is the rightmost portion of the vehicle steering attachment.

Although the stages are disclosed in a particular order, it should be understood that the order is disclosed for illustrative purposes only. Stages may be combined, separated, reordered, and various intermediary stages may exist. Accordingly, it should be understood that the various stages, in various embodiments, may be performed in arrangements that differ from the ones claimed below. Moreover, various stages may be added or removed from the without altering or deterring from the fundamental scope of the depicted methods and systems disclosed herein.

IV. Aspects

The following disclose various Aspects of the present disclosure. The various Aspects are not to be construed as patent claims unless the language of the Aspect appears as a patent claim. The Aspects describe various non-limiting embodiments of the present disclosure.

Aspect 1. An attachment of any aspect, wherein the vehicle steering attachment is substantially curved in shape.

Aspect 2. The attachment of any aspect, wherein the first end arcs in the opposite direction as the second end.

Aspect 3. The attachment of any aspect, wherein the middle portion is substantially horizontal.

Aspect 4. The method of any other aspect, wherein the vehicle steering attachment is adjustable such that the first end and the second end may be positioned on a plurality of portions of the vehicle steering device.

Aspect 5. The attachment of any aspect, wherein the middle portion is configured to secure to the vehicle steering device.

V. Claims

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

Insofar as the description above and the accompanying drawing disclose any additional subject matter that is not within the scope of the claims below, the disclosures are not dedicated to the public and the right to file one or more applications to claims such additional disclosures is reserved.

The following is claimed:

1. A vehicle steering device comprising:
   a rim attachment configured to removably secure to a first handle attached to a central hub via a first spoke and a second handle attached to the central hub via a second spoke, the central hub configured to connect to a steering column of a vehicle, wherein the rim attachment comprises:
      a first end, a second end, and a middle member extending from the first end to the second end;
      the first end includes a first concave recess configured to sit flush on a convex top surface of the first handle;
      the second end includes a second concave recess configured to sit flush on a convex top surface of the second handle;
      a fastening element that at least partially wraps around the first spoke.

2. The vehicle steering device according to claim 1, wherein the rim attachment further comprises a bottom member, separated from the middle member, extending from the first end to the second end.

3. The vehicle steering device according to claim 2, wherein:
   the first spoke includes a top surface;
   the second spoke includes a top surface;
   the central hub includes a top surface; and
   the bottom member sits flush against the top surfaces of the first spoke, central hub, and second spoke.

4. The vehicle steering device according to claim 2, wherein:
   the fastening element includes a fastening element protrusion extending therefrom and defining a fastening element hole;
   the bottom member includes a bottom member protrusion extending therefrom and defining a bottom member hole; and
   a screw passes through the bottom member hole and is received within the fastening element hole.

5. The vehicle steering device according to claim 1, wherein the fastening element is a flexible strap with a first snap-fit element disposed at a first end of the flexible strap.

6. The vehicle steering device according to claim 5, wherein the fastening element includes a second snap-fit element disposed at a second end of the flexible strap.

7. The vehicle steering device according to claim 6, wherein each of the first and second snap-fit elements of the fastening element engage with a respective receiving element disposed on a respective end strap disposed on the first end of the rim attachment.

8. A vehicle steering device comprising:
   a rim attachment configured to removably secure to a first handle attached to a central hub via a first spoke and a second handle attached to the central hub via a second spoke, the central hub configured to connect to a steering column of a vehicle, wherein the rim attachment comprises:
      a first end, a second end, and a middle portion extending from the first to the second end;
      the first end includes a first concave portion configured to sit flush on a top surface of the first handle;
      the second end includes a second concave portion configured to sit flush on a top surface of the second handle;
      a first strap disposed on the first end of the rim attachment; and
      a first receiving element disposed on the first strap, the first receiving element configured to receive a first snap-fit element.

9. The vehicle steering device according to claim 8, wherein:
   a second strap is disposed on the second end of the rim attachment; and
   a second receiving element is disposed on the second strap.

10. The vehicle steering device according to claim 9, wherein:
    a rim portion extends from the first handle to the second handle;
    a fastening strap includes the first snap-fit element disposed at a first end of the fastening strap and a second snap-fit element disposed at a second end of the fastening strap; and
    the fastening strap is disposed along a perimeter of the rim portion from the first handle to the second handle.

11. The vehicle steering device according to claim 8, wherein:
    a second strap is disposed on the first end; and
    a second receiving element is disposed on the second strap.

12. The vehicle steering device according to claim 11, wherein:
    a fastening strap includes the first snap-fit element disposed at a first end of the fastening strap and a second snap-fit element disposed at a second end of the fastening strap; and
    the fastening strap wraps around the first spoke.

* * * * *